(12) United States Patent
Kakizaki

(10) Patent No.: US 8,117,353 B2
(45) Date of Patent: Feb. 14, 2012

(54) IMAGE PROCESSING APPARATUS

(75) Inventor: Sohei Kakizaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 26 days.

(21) Appl. No.: 12/333,659

(22) Filed: Dec. 12, 2008

(65) Prior Publication Data

US 2009/0157912 A1    Jun. 18, 2009

(30) Foreign Application Priority Data

Dec. 18, 2007    (JP) ................. 2007-326463

(51) Int. Cl.
*G06F 3/00* (2006.01)
(52) U.S. Cl. ......... 710/13; 710/5; 710/7; 710/8; 710/12; 710/20; 710/33; 710/62
(58) Field of Classification Search .............. 710/5, 7, 710/8, 12, 13, 20, 33, 62
See application file for complete search history.

(56) References Cited

U.S. PATENT DOCUMENTS

| | | | | |
|---|---|---|---|---|
| 2002/0044295 | A1* | 4/2002 | Tanaka | 358/1.13 |
| 2004/0054863 | A1 | 3/2004 | Harada et al. | |
| 2004/0218210 | A1* | 11/2004 | Shozaki et al. | 358/1.15 |
| 2006/0176497 | A1* | 8/2006 | Kimura et al. | 358/1.13 |
| 2006/0253652 | A1 | 11/2006 | Harada et al. | |
| 2007/0222802 | A1* | 9/2007 | Yoshida | 347/5 |
| 2008/0088454 | A1* | 4/2008 | Flores et al. | 340/572.4 |
| 2009/0086173 | A1* | 4/2009 | Combs et al. | 353/122 |
| 2009/0091628 | A1* | 4/2009 | Narusawa et al. | 348/207.2 |
| 2009/0244624 | A1* | 10/2009 | Endo | 358/1.16 |

FOREIGN PATENT DOCUMENTS

| | | |
|---|---|---|
| EP | 1376592 A2 | 1/2004 |
| JP | 4367074 A | 12/1992 |
| JP | 09128511 A | 5/1997 |
| JP | 2002222391 A | 8/2002 |
| JP | 2004086861 A | 3/2004 |
| JP | 2006-330997 A | 12/2006 |
| WO | 02061674 A1 | 8/2002 |

* cited by examiner

*Primary Examiner* — Tariq Hafiz
*Assistant Examiner* — Jasjit Vidwan
(74) *Attorney, Agent, or Firm* — Panitch Schwarze Belisario & Nadel LLP

(57) ABSTRACT

An image processing apparatus is capable of communicating data with a plurality of external apparatuses attached to the image processing apparatus. Each of the external apparatuses includes an advisor that advises a user of access to the external apparatus. A display section displays information on the external apparatuses attached to the image processing apparatus. A selecting section selects a desired one external apparatus from among the plurality of external apparatuses displayed on said display section. A transmitter transmits an access command to the desired one external apparatus. When the selected external apparatus receives the access command, the advisor advises the user of the access to the selected external apparatus, emitting flashing light.

10 Claims, 8 Drawing Sheets

220

OPERATION HISTORY

PLEASE SELECT A FILE THAT YOU
WANT TO CHECK DESTINATION

ORDER OF DATE

☐ fileName004.jpg   USBMEM1   2006/01/13 22:45
☐ fileName002.jpg   USBMEM1   2006/02/10 11:06
☐ fileName001.jpg   USBMEM1   2006/02/25 13:26
☐ fileName003.pdf   USBMEM3   2006/03/05 09:06
☐ fileName006.pdf   USBMEM3   2006/03/07 10:10

FLASHING OF ADVISING LAMP

IMAGE PROCESSING APPARATUS

BACKGROUND OF THE INVENTION

1. Field of the Invention

The present invention relates to an image processing apparatus capable of communicating data with a plurality of external apparatuses attached to and detected by the image processing apparatus, each of the external apparatuses incorporating an advising means for advising a user of access to the external apparatus.

2. Description of the Related Art

Recent image processing apparatuses such as multi-function printers are capable of storing photographic image data captured with a digital camera into an external memory medium such as a memory card or a USB, and of printing photographic image data read from the external memory medium. Some multi-function printers may incorporate a scanner that reads the image of an original, being capable of storing the image data of an original into an external storage medium.

Japanese Patent Application Laid-Open No. 2006-330997 discloses one such image processing apparatus. Memory cards are inserted into the apparatus. A search keyword assigned to the memory card is checked against a search keyword inputted by an operator. If the two key words do not coincide, the keyword inputted by the operator is displayed to the operator in a manner different from a usual way, thereby advising the operator that the two keywords do not coincide.

However, the aforementioned prior art image processing apparatus is not designed to communicate with a plurality of storage media (e.g., USB memories or memory cards), so that the operator is not informed of which storage medium the apparatus is communicating with. Thus, the operator has to either check the appearance of the media or search the contents of files stored in the media before he can properly identify a desired memory card or USB from many other storage media.

The operator, for example, has to check the data stored in the memory card or USB memory displayed on the display panel of the image processing apparatus. However, time and effort are required to identify a desired medium. Moreover, the user may dismount other user's medium by mistake after a storing pull-out or printing operations of data.

SUMMARY OF THE INVENTION

An object of the invention is to provide an image processing apparatus capable of identifying a desired apparatus from among a plurality of external memory media connected to the image processing apparatus by performing a relatively simple operation.

An image processing apparatus is capable of communicating data with a plurality of external apparatuses attached to the image processing apparatus, each of the plurality of external apparatuses including an advisor that advises a user of access to the external apparatus. A display section displays information on the external apparatuses attached to the image processing apparatus. A selecting section selects a desired one external apparatus from among the plurality of external apparatuses displayed on said display section. A transmitter transmits an access command to the desired one external apparatus. When the selected external apparatus receives the access command, the advisor advises the user of the access to the selected external apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Figure 1:
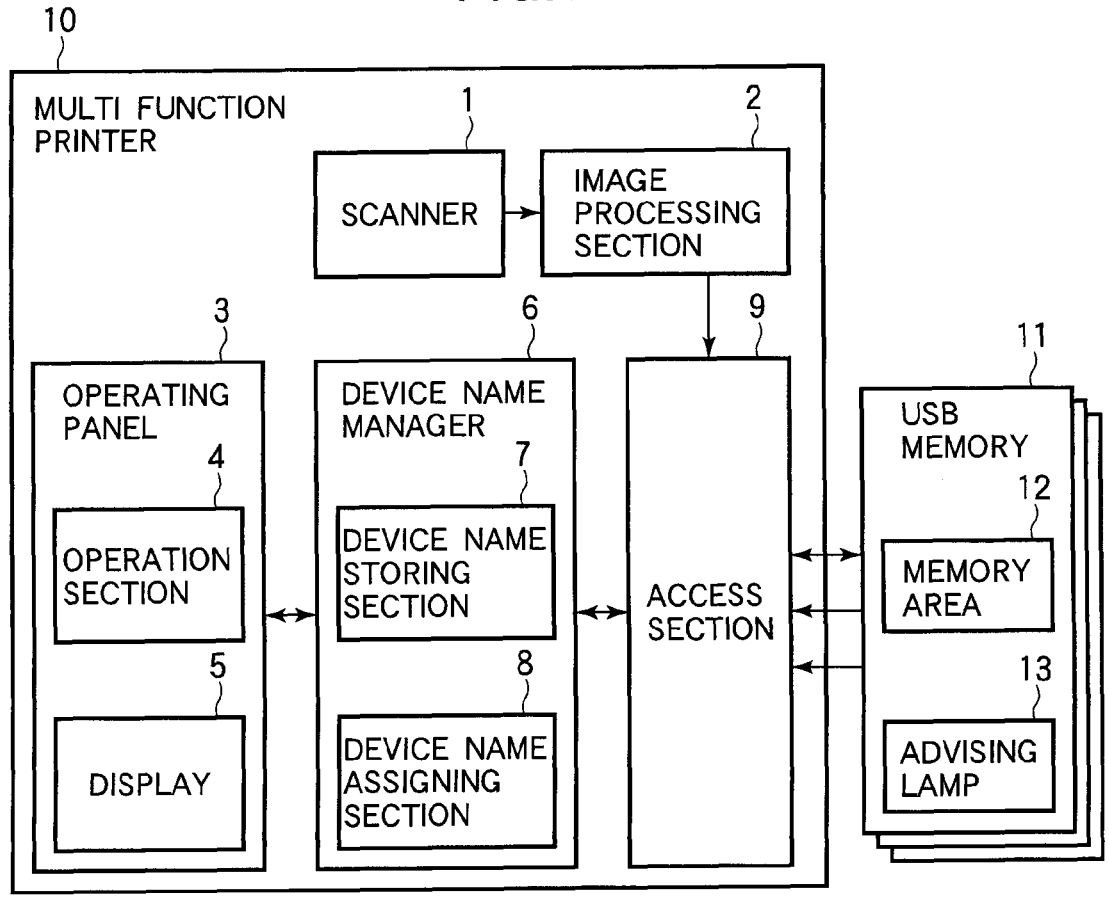
FIG. 1 is a block diagram illustrating the configuration of a multi-function printer (MFP) of a first embodiment.

Embodiments of the invention will be described in detail with reference to the accompanying drawings. Like elements have been given the same reference numerals. An image processing apparatus of the invention will be described in terms of a multi-function printer, and an external apparatus will be described in terms of a universal serial bus memory (USB).

First Embodiment

FIG. 1 is a block diagram illustrating the configuration of a multi-function printer (referred to as MFP hereinafter) of a first embodiment. The MFP 10 is capable of reading the image of an original and processing the image data. The MFP 10 includes a scanner 1, an image processing section 2, an operating panel 3 that incorporates a selecting section or operation section 4 and a display 5, a device name manager 6, a transmitter or access section 9, and a plurality of USB memories 11. The device name manager 6 includes a device name storing section 7 and a device name assigning section 8. The USB memories 11 as an external apparatus are external memory media, and are attached to a USB interface. The MFP 10 may also include print engines (not shown) connected to the image processing section 2.

The scanner 1 reads the image of an original placed in the MFP 10. The image processing section 2 converts the image data of the original, captured with the scanner 1, into a print data format that may be printed by the print engine. Alternatively, the image processing section 2 converts the image data of the original into a data format that may be saved into the USB memory 11.

The operating panel 3 includes the operation section 4 for controlling the operation of the MFP 10 and a later described flashing operation of an access lamp or advising lamp (referred to as hereinafter advising lamp) 13 of the USB memory 11. The operation section 4 includes a clear touch panel through which an operator controls the advising lamp 13 and selects a desired one external apparatus from among a plurality of external apparatuses displayed on the display section 5. The display 5 takes the form of, for example, an LCD that displays device names received from the device manager 6. The display section 5 displays information on the external apparatuses attached to the MFP 10. While the operation section 4 has been described in terms of a touch panel, the operation section 4 may also take the form of a key board.

The device name manager 6 includes the device name storing section 7 and the device name assigning section 8. The device name storing section 7 stores the device names of the USB memories 11 attached to the MFP 10. The device name assigning section 8 assigns a device name to a corresponding USB memory 11 if the USB memory 11 has no device name.

The access section 9 is an interface through which the image data converted in the image processing section 2 is outputted or transmitted to the corresponding USB memory 11, and the device name information is obtained from USB memory 11.

The USB memory 11 is an external apparatus detachably attached to the MFP 10. The USB memory 11 includes a memory area 12 and an advising lamp 13. The memory area 12 stores the image data converted in the image processing section 2. The advising lamp 13 indicates that the USB memory 11 is being accessed by the MFP 10.

Figure 2:
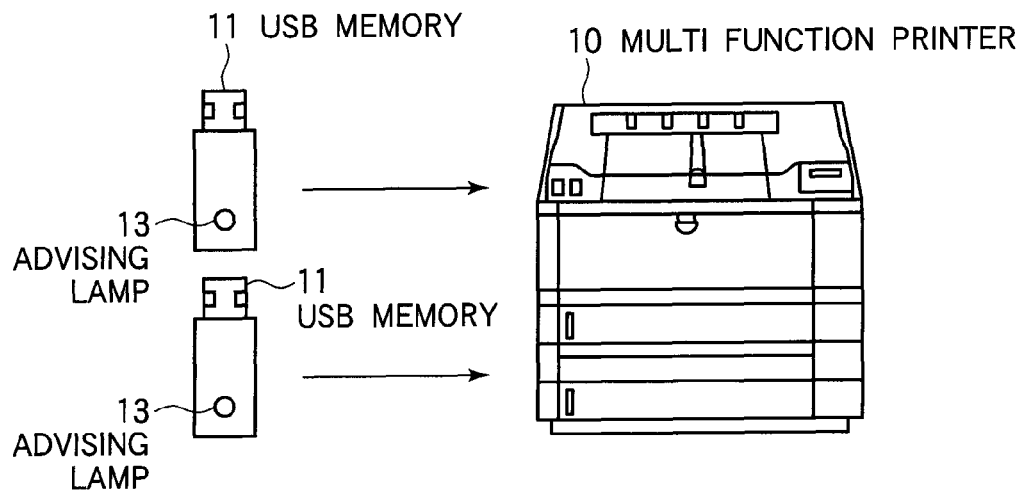
FIG. 2 illustrates a system configuration of the MFP and USB memories of the first embodiment.

FIG. 2 illustrates the system configuration of the MFP 10 and USB memories 11 of the first embodiment. The MFP 10 includes a plurality of USB ports (not shown) so that a plurality of USB memories 11 may be attached at a time into the MFP 10.

The image processing apparatus is configured so that the USB memories 11 may operate independently of one another, allowing a plurality of users to use their corresponding USB memories 11. As shown in FIG. 2, commercially available USB memories 11 are equipped with the advising lamps 13 so that each user can check the advising lamp 13 by inspection from the outside of the MFP 10 to determine if the advising lamp 13 of the user's USB memory is lighting up or flashing.
{Operation}

The MFP 10 of the aforementioned configuration operates as follows: The operation of the MFP 10 will be described with reference to a flowchart shown in FIGS. 3 and 7, disc parameters shown in FIG. 4, and an example of display screen of the operation panel 4 of the MFP 10 shown in FIGS. 5, 6, and 8.

Figure 3:
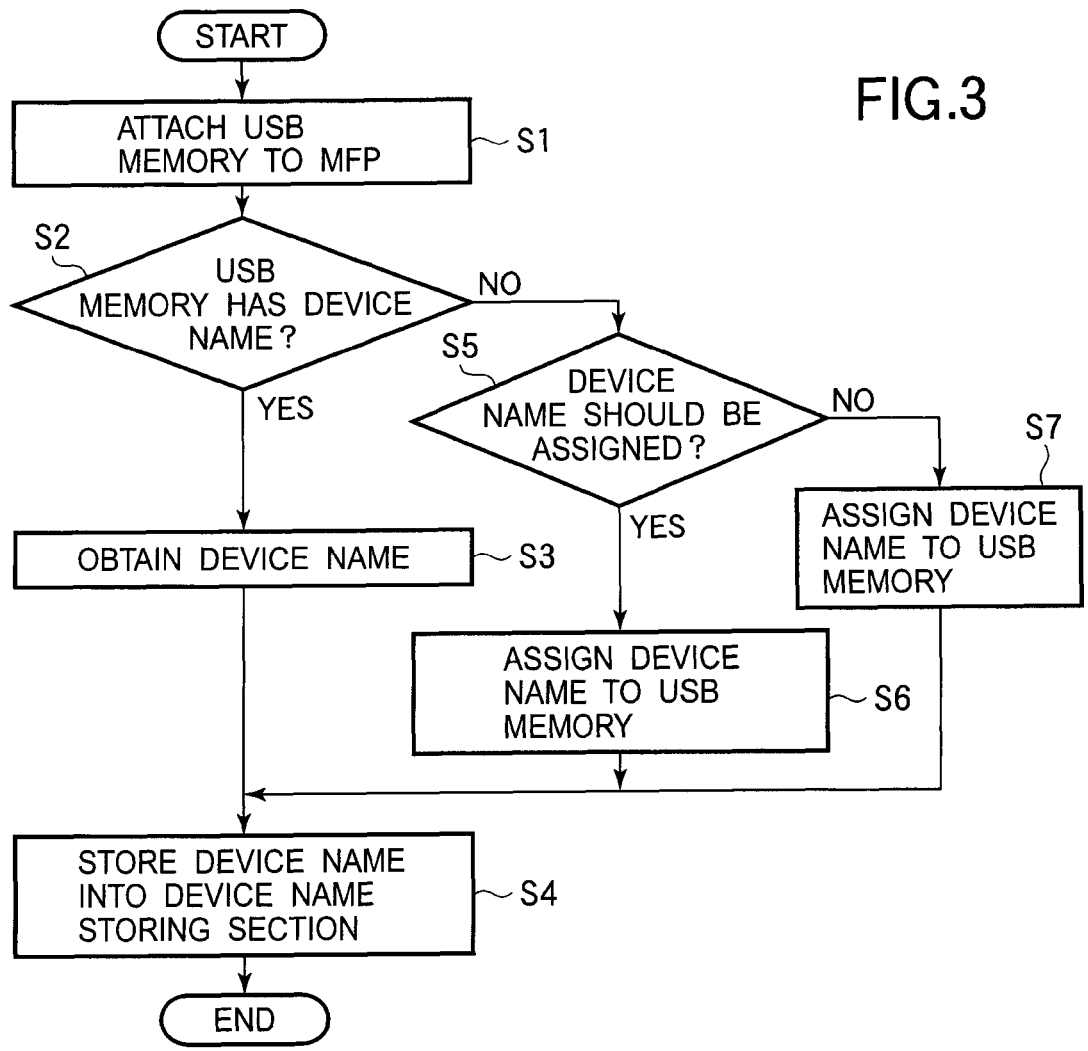
FIG. 3 is a flowchart illustrating the process in which a device name is assigned to a corresponding USB memory attached into the printer.

FIG. 3 is a flowchart illustrating the process in which a device name is assigned to a corresponding USB memory 11 attached into the MFP 10.

Figure 4:
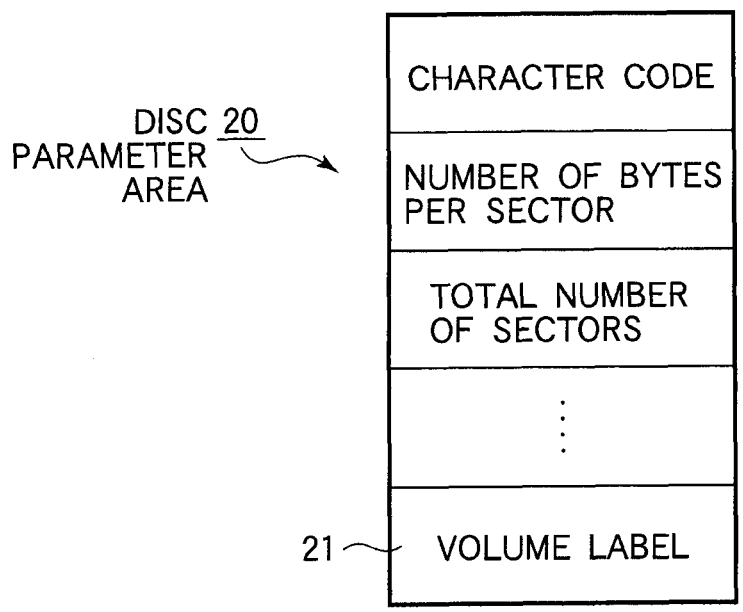
FIG. 4 illustrates an example of a disc parameter area of a USB memory.

FIG. 4 illustrates an example of a disc parameter area of the USB memory 11.

Figure 5:
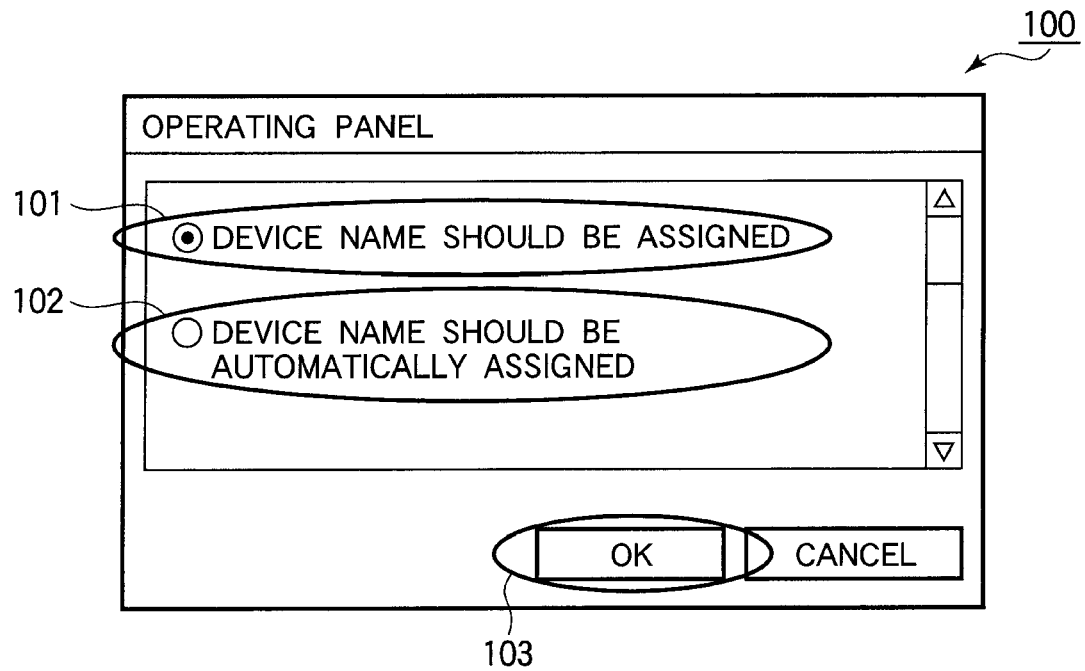
FIG. 5 illustrates an example of a display screen on an operating panel.

FIG. 5 illustrates an example of the display screen 100 on the operating panel 3.

Figure 6:
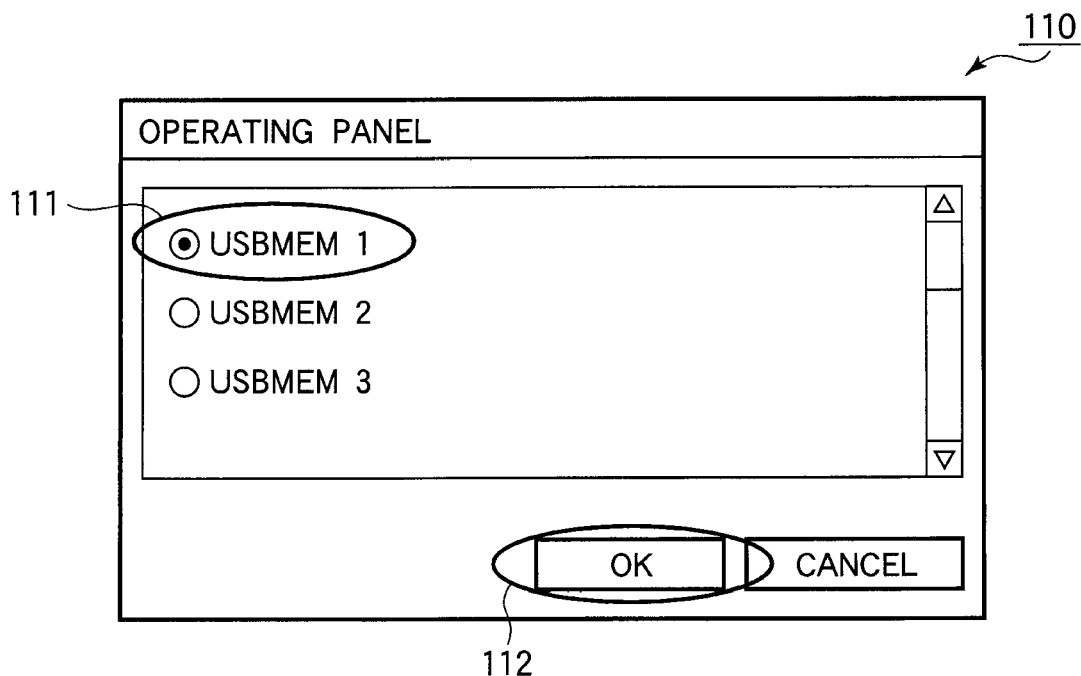
FIG. 6 illustrates an example of another display screen on the operating panel.

FIG. 6 illustrates an example of another display screen 110 on the operating panel 3.

The MFP 10 detects when the USB memory 11 has been attached (step S1). Then, a check is made to determine whether the attached USB memory 11 has been assigned a device name (step S2).

The device name will be described. The location of the device name in the USB memory 11 may vary from USB memory to USB memory. However, the USB memory 11 usually has volume label information in a disc parameter region 20 in which the device name is stored. The volume label information in the disc parameter area 20 contains the device name.

FIG. 4 illustrates a disc parameter area 20 of the first embodiment. The device name is obtained or modified according to the information on the volume label 21 resident in the disc parameter area 20.

Referring back to FIG. 3, if a device name has been assigned to the USB memory 11, the device name contained in the information on the volume label 21 is obtained (step S3), and is then stored into the device name storing section 7 of the device name manager 6 (step S4).

If the device name has not been assigned to the USB memory 11, a message appears on the screen 10 (FIG. 6), inquiring the user as to whether a device name should be assigned to the USB memory 11 (step S5).

If the user selects an option button 101 (FIG. 5) indicating "DEVICE NAME SHOULD BE ASSIGNED" and then clicks on an OK button 103 (FIG. 5), a screen 110 shown in FIG. 6 is displayed. Then, if the user selects the option button 111 indicating "USBMEM1" and clicks on the OK button 112, the selected device name is written over the information on the volume label 21, thereby assigning the user's desired device name to the USB memory 11 (step S6).

Unless a USB memory has been assigned its device name before insertion of the USB memory into the image processing apparatus, the device names displayed on the screen 110 as a option are preferably in the form of "USEMEM#" where "#" is an appropriate number. Of course, the device name may be in the form of "USBMEM$" where "$" is a letter of the alphabet so that the device names are assigned in alphabetical order.

If the user selects the option button 102 indicating "DEVICE NAME SHOULD BE AUTOMATICALLY ASSIGNED" and then clicks the OK button 103, the device assigning section 8 of the MFP 10 assigns the device name automatically (step S7), and then informs the user of the assigned device name.

Unless the USB memories already have their device names, the device names actually assigned to the USB memories may be in the form of "USBMEM#" where "#" is a number. The "#" for a following one of adjacent USB memories should be one larger number than that for a preceding one. For example, assume the preceding one of the adjacent USB memories has been assigned "USBMEM3", the following one is assigned "USBMEM4", and is displayed to the user. Alternatively, the device name may also be in the form of "USBMEM$" where "$" is a letter of the alphabet such that the device names are assigned in alphabetical order.

Once the device name(s) has been assigned at step S6 or step S7, the device name(s) is stored into the device name storing section 7 of the device name manager 6 (step S4).

Figure 7:
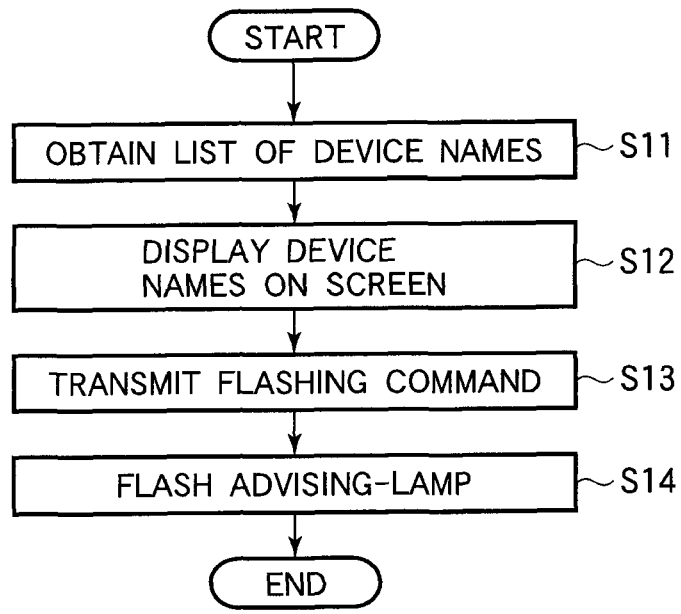
FIG. 7 is a flowchart illustrating the flashing of an advising lamp that helps a user pull out a desired, right USB memory.

FIG. 7 is a flowchart illustrating the flashing of the advising lamp that helps the user pull out a desired, right USB memory 11.

Assume that a plurality of USB memories 11 have been inserted into the MFP 10, and menus associated with the USB memories 11 are displayed on the operation panel 13. If the user selects a menu for the flashing operation of the USB memory 11, the list of device names is obtained (step S11), and is displayed as a screen 120 shown in FIG. 8 (step S12). The screen 120 also includes the device names and selection buttons.

The list of device names shows the device names of the USB memories 11 that have been inserted into the MFP 10 and detected by the MFP 10, and that are ready to communicate with the MFP 10.

When the operator desires to pull out a USB memory having a device name "USBMEM1," he selects the button of "USBMEM1" and clicks on a command button "FLASHING OF ADVISING LAMP" 122. Then, the access section 9 transmits an access command or a flashing command to a controller (not shown) in the USB memory 11 (step S13).

The flashing command may take the form of a virtual read command (referred to as "dummy read command"), and is sent to the USB memory 11.

When the USB memory 11 receives the dummy read command, a virtual operation for reading data is activated so that the advising lamp flashes (step S14).

Figure 8:
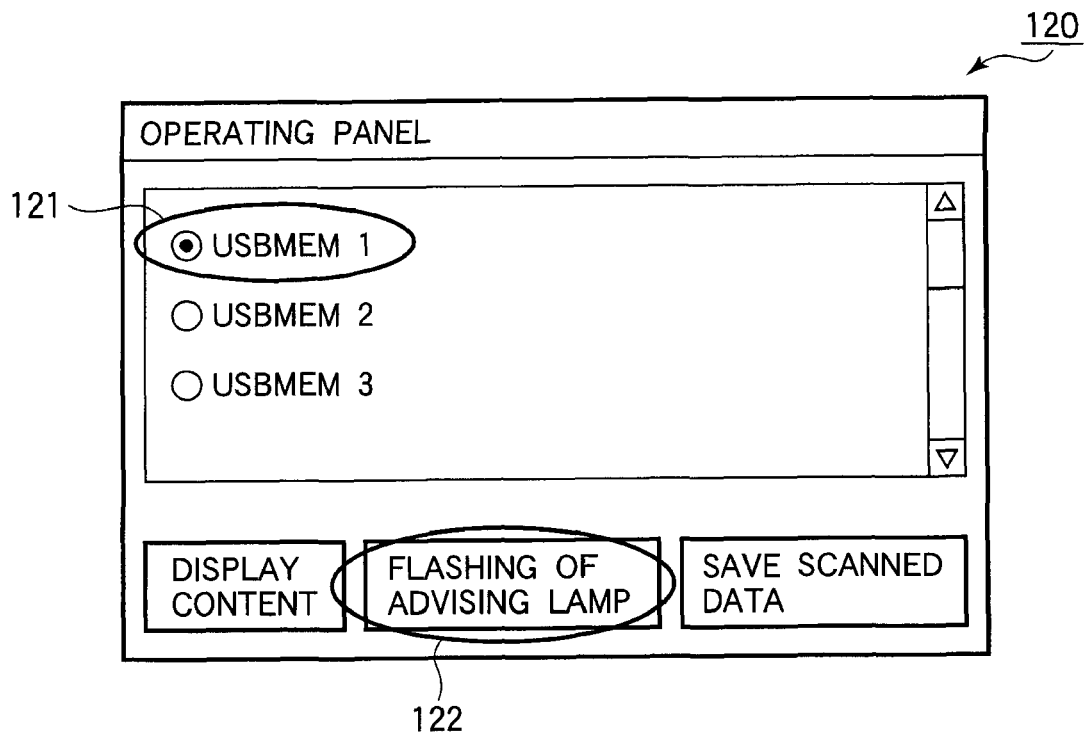
FIG. 8 illustrates an example of a display screen on the operating panel.

When the user desires to check the content of the USB memory 11 selected by using the option button, the user clicks on the command button "DISPLAY CONTENT" on the display 120 of the operating panel 3 shown in FIG. 8. Upon clicking, the volume name, file name, date on which the file is saved, and file size are displayed. When the image data captured with the scanner should be stored into the USB memory 11, the user clicks on the command button "SAVE SCANNED DATA."

As described above, the device name assigning section assigns a device name to a corresponding USB memory on a USB memory basis. The device selecting section selects a user's desired USB memory by using the device name. The dummy reading section transmits a virtual read command to the selected USB memory. The advising lamp of the selected USB memory flashes. Thus, the user may be able to identify a desired USB memory from among a plurality of USB memories inserted into and detected by the MFP 10.

Second Embodiment

Figure 9:
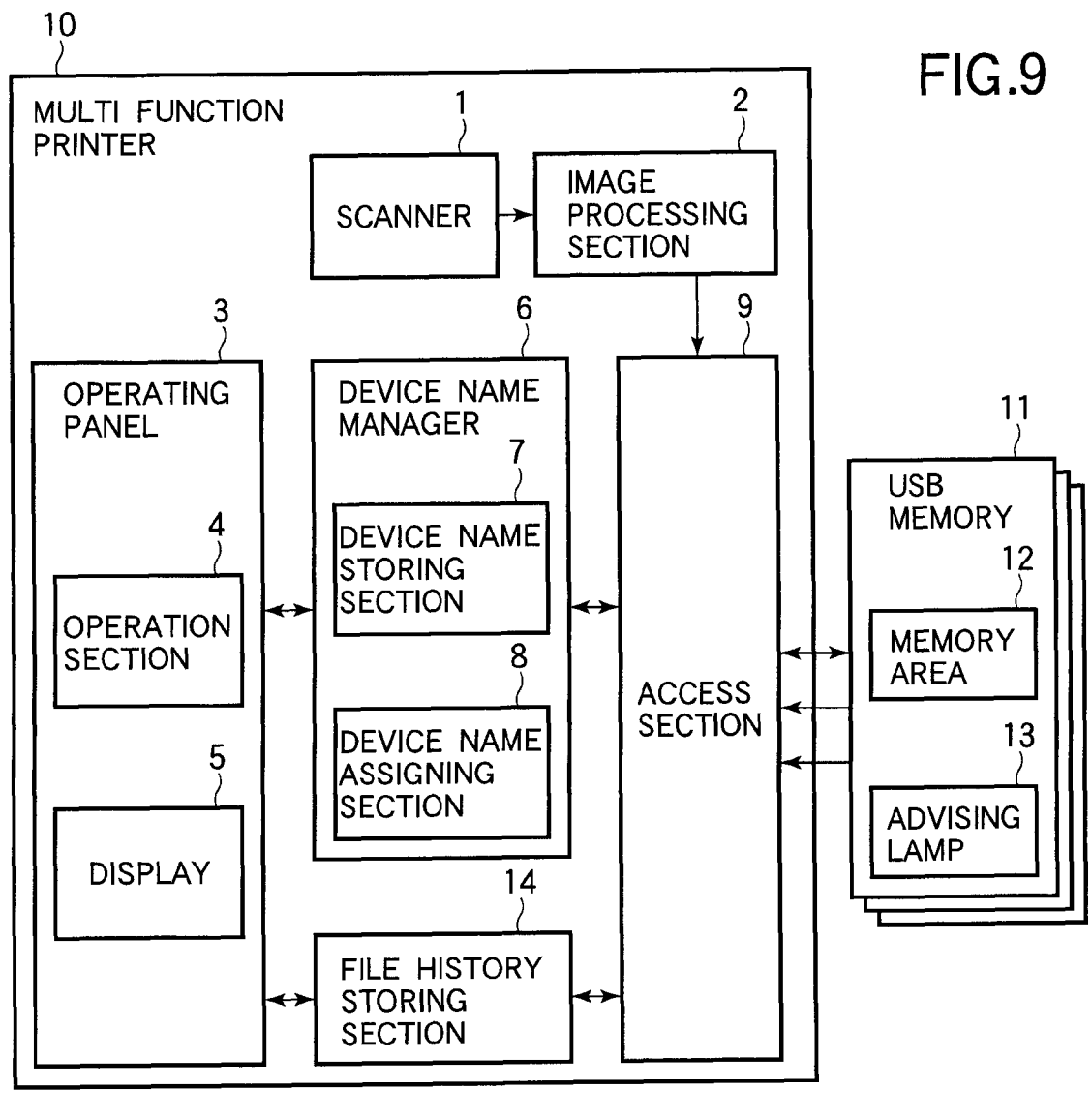
FIG. 9 is a block diagram illustrating the configuration of an MFP of a second embodiment.

FIG. 9 is a block diagram illustrating the configuration of a multi-function printer (MFP) of a second embodiment.

Figure 10:
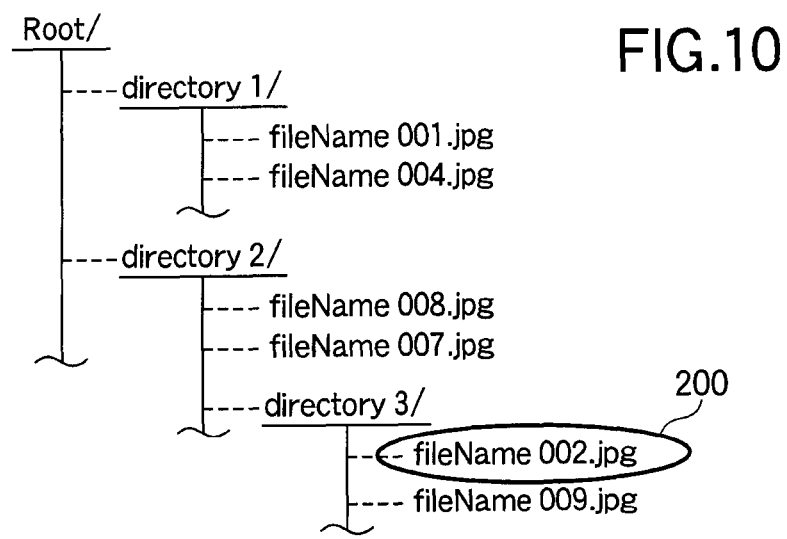
FIG. 10 illustrates a directory and a file list stored in the USB memory.

FIG. 10 illustrates a directory and a file list stored in the USB memory.

When a plurality of USB memories 11 are inserted into a MFP 10, a user often desires to identify, from the plurality of USB memories, a USB memory in which a particular file is saved. For this purpose, a directory and a file list stored in the USB memory are displayed as shown in FIG. 10, and the user searches the displayed files for his desired file. This checking needs to be performed on a USB memory-to-USB memory basis until the desired file is found, and is rather a time consuming operation.

{Configuration}

In order to solve the aforementioned drawbacks, the MFP 10 of a second embodiment employs a file history storing section 14. The file history storing section 14 obtains data including image data from an external device, e.g., USB memory, connected to the MFP 10, and stores the file name, device name, time and date, and file size have been stored in the external device. The remaining portion of the configuration of the second embodiment is substantially the same as that of the first embodiment. Thus, for the sake of simplicity, the detailed description is omitted.

{Operation}

The MFP 10 of the aforementioned configuration operates as follows:

The operation will be described with reference to flowcharts shown in FIGS. 11 and 13 and display screens shown in FIGS. 14 and 16.

Figure 11:
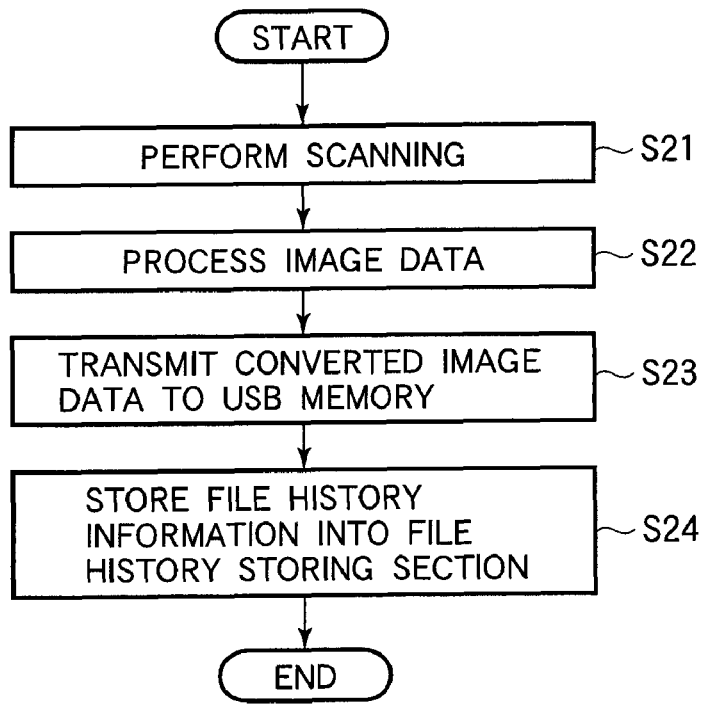
FIG. 11 is a flowchart illustrating the operation in which the data scanned by a scanner is saved in the USB memory.

FIG. 11 is a flowchart illustrating the operation in which the data scanned by a scanner 1 is saved into the USB memory 11.

Figure 12:
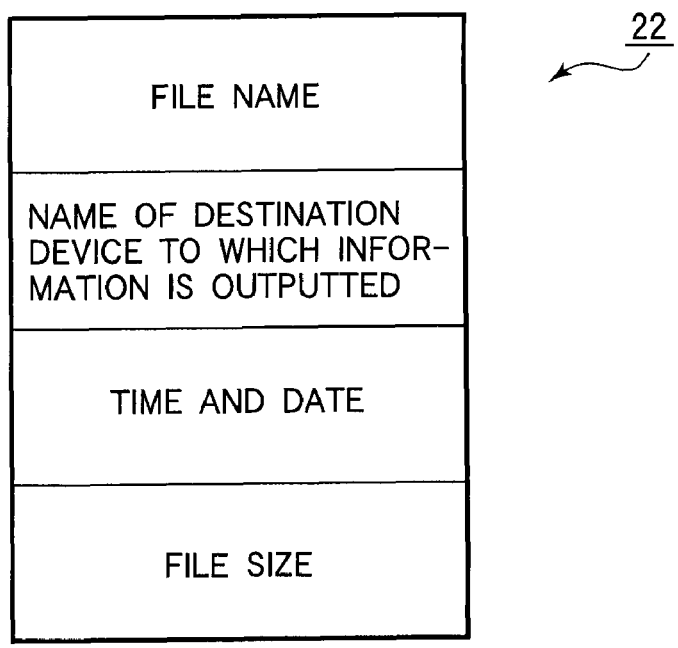
FIG. 12 is a flowchart illustrating file history information.

FIG. 12 is a flowchart illustrating file history information (history information on a file) 22.

The user operates the operation section 4 of the MFP 10 to start scanning, and then the scanner 1 performs scanning (step S21). An image processing section 2 converts image data obtained by scanning an original document into a required data format, and processes the captured data (step S22).

Then, the access section 9 transmits the converted image data to the USB memory 11 (step S23). Upon completion of data transmission, the file history information 22 including the file name, device name, time and date, and file size is stored into the file history storing section 14 (step S24).

The above process is performed every time a file is saved into or deleted from the USB memory 11, and the corresponding file history information 22 is saved into or deleted from the file history storing section 14.

Figure 13:
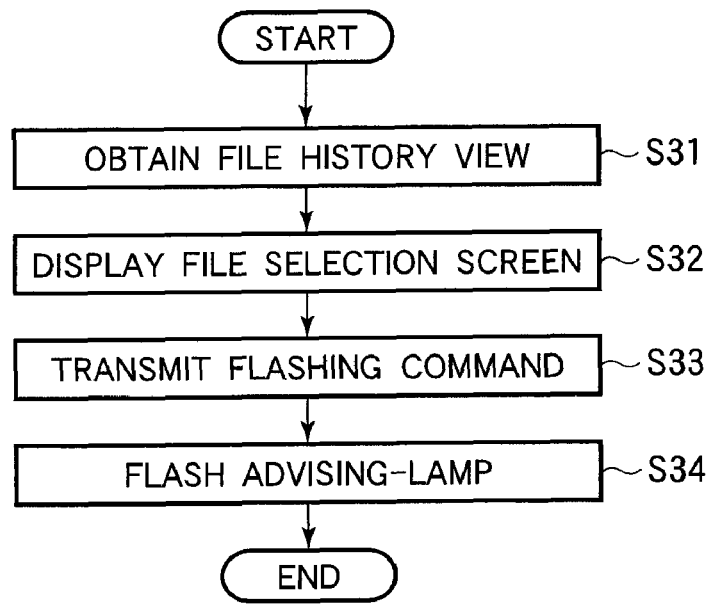
FIG. 13 is a flowchart illustrating the operation of the MFP when the advising lamp flashes.

FIG. 13 is a flowchart illustrating the operation of the MFP 10 when an access lamp or advising lamp 13 flashes. Assume that a plurality of USB memories 11 have been inserted into and detected by the MFP 10. If a menu associated with the USB memory 11 is displayed on an operating panel 3, a file history view is obtained from the file history storing section 14 (step S31), and then a file selection screen that lists the file history view is displayed (step S32).

Figure 14:
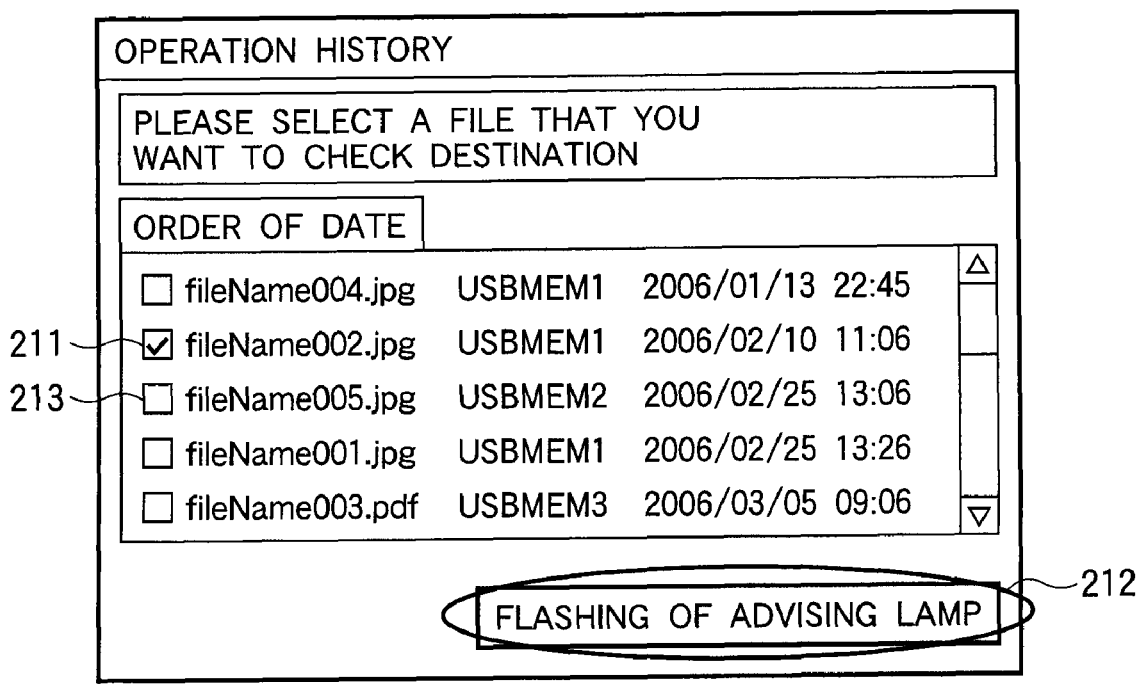
FIG. 14 illustrates an example of screen of the operating panel of the MFP.

FIG. 14 illustrates a screen 210 of the operating panel 3 of the MFP 10. Referring to FIG. 14, the screen 210 shows the file history view that primarily includes the file names, device names, and times and dates for all files stored in the USB memory 11. The files include data obtained by the scanner 1 and stored in the USB memory 11.

Assume that the operator desires to identify a USB memory 11 that holds "filename002.jpg" 200 shown in FIG. 10. If he selects a check box 211 of "filename002.jpg" 200, and clicks on the button 212 indicating "FLASHING OF ADVISING LAMP", the access section 9 transmits a FLASHING OF ADVISING LAMP command (referred to as dummy command hereinafter) to the USB memory 11 (step S33).

Upon receiving the dummy command, the advising lamp 13 of the USB memory 11 is caused to flash indicating to the operator that "filename002.jpg" 200 has been stored in the USB memory (step S34).

The files displayed on the screen 210 shown in FIG. 14 may be in the order of file name or time and date, or on a file basis. It is more preferable that the system is configured so that operator is allowed to select one of these manners in which the files are displayed.

The history file view in the form of the screen 210 displayed on the operating panel 3 should show the histories of only the USB memories 11 inserted into and detected by the MFP 10. The screen 210 shown in FIG. 14 is one such history file view.

Figures 15, 16:
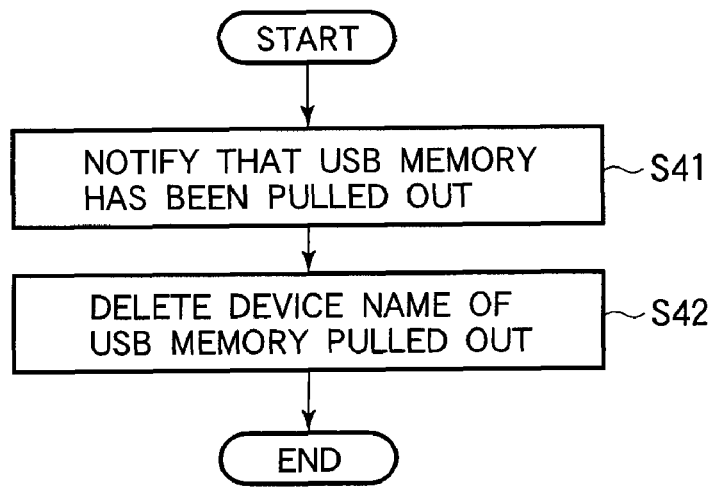
FIG. 15 illustrates the operation in which a USB memory corresponding to "USEBMEM2" is drawn out of the MFP when the screen is appearing on the display.
FIG. 16 illustrates an example of screen of the operating panel of the MFP.

FIG. 15 illustrates the operation in which when the screen 210 is appearing on the display, a USB memory corresponding to "USEBMEM2" is drawn out of the MFP 10.

FIG. 16 illustrates an example of the screen 210 of the operating panel of the MFP 10.

Assume that the USB memory corresponding to "USEBMEM2" holds "filename002.jpg" 200. The access section 9 detects when the USB memory corresponding to "USEBMEM2" has been drawn out of the MFP 10, and notifies a device name manager 6 and the file history storing section 14 that the USB memory having the device name "USEBMEM2" has been pulled out (step S41), so that the history corresponding to "USEBMEM2" is deleted from the file history storing section 14 (step S42). In this manner, the history file associated with "USBMEM2" disappears from the screen 220 as shown in FIG. 16.

As described above, deleting the information on a USB memory not detected by the MFP 10 facilitates search for a desired USB memory 11 as well as making it easy to find and select a desired file.

As described above, the MFP 10 includes the file history storing section that holds the file history information. When the user desires to identify a USB memory that holds a desired file, the file history information is displayed to the user so that the user can selects his desired USB memory. The selected USB memory is indicated by flashing of the advising lamp. This facilitates the locating of a USB memory that holds a desired file from among a plurality of USB memories inserted in the MFP 10.

{Modification}

Although the present invention has been described in terms of a multi function printer, the invention may also be applicable to apparatuses including scanners, copying machines and facsimile machines as long as a plurality of USB memories may be linked to the apparatus and the apparatus may communicate data with the USB memories.

While the advising means of the external apparatus of the embodiments have been described with respect to a USB memory having an access lamp as an advising means, the advising means may be a speaker that emits a message, for example, "This is the first slot" to indicate the USB memory, or an LCD display that displays the USB memory.

While the first and second embodiments have been described with respect to USB memories as an external apparatus, the external apparatus may be, for example, a network I/F board (network I/F card) attached to a PC or a printer, an option (e.g., tray) attached to a printer, a portable hard disc drive or other medium as long as the external apparatus is equipped with an advising means that informs the user of access to the medium, and that is detachably attachable to the MFP. The present invention is applicable to image processing apparatuses capable of communicating with a plurality of external apparatuses including USB memories.

The invention being thus described, it will be obvious that the same may be varied in many ways. Such variations are not to be regarded as a departure from the scope of the invention, and all such modifications as would be obvious to one skilled in the art intended to be included within the scope of the following claims.

What is claimed is:

1. An image processing system comprising:
an image processing apparatus; and
a plurality of external apparatuses configured to attach and communicate with the image processing apparatus, each of the plurality of external apparatuses including an advisor that advises a user of access to the external apparatus,
wherein the image processing apparatus includes:
a transmitter configured to transmit a file of image data to a corresponding one of the plurality of external apparatuses into which the file is stored;
an information storing section configured to store a list of items of history information, the list of items of history information containing at least a history of the file, a file name of the file, and an apparatus name of one of the plurality of external apparatuses corresponding to the file name, the list of items of history information being stored when the file is stored into the corresponding one of the plurality of external apparatuses;
a display section that displays the list of items of history information to the user;
a selecting section through which the user selects a desired file name based on the list of items of history information displayed on the display section; and
wherein when the user has selected the desired file name, the transmitter transmits an access command to the external apparatus corresponding to the selected file name;
wherein when the external apparatus corresponding to the selected file name receives the access command, the advisor advises the user of the access to the external apparatus corresponding to the selected file name.

2. The image processing system according to claim 1, wherein the image processing apparatus further comprises a device name assigning section that assigns a device name to a corresponding one of the plurality of external apparatuses.

3. The image processing system according to claim 1, wherein the image processing apparatus further comprises a file history storing section that stores history information on a file saved in a corresponding one of the plurality of external apparatuses.

4. The image processing system according to claim 3, wherein said file history storing section deletes history information on an external apparatus not detected by the image processing apparatus.

5. The image processing system according to claim 1, wherein the external apparatuses are external storage devices.

6. The image processing system according to claim 5, wherein at least one of the external storage devices is a USB memory.

7. The image processing system according to claim 1, wherein the access command is a read command.

8. The image processing system according to claim 1, wherein the external apparatuses are selected from the group comprising an external storage device and a network I/F card.

9. The image processing system according to claim 1, wherein the external apparatuses are selected from the group comprising an external storage device and a tray.

10. The image processing system according to claim 1, wherein the image processing apparatus further comprises a command button, wherein when the user operates the command button, said transmitter transmits the access command to the desired one external apparatus.

* * * * *